W. Watson,
Sawing Stone.
Nº 11,432.   Patented Aug. 1, 1854.
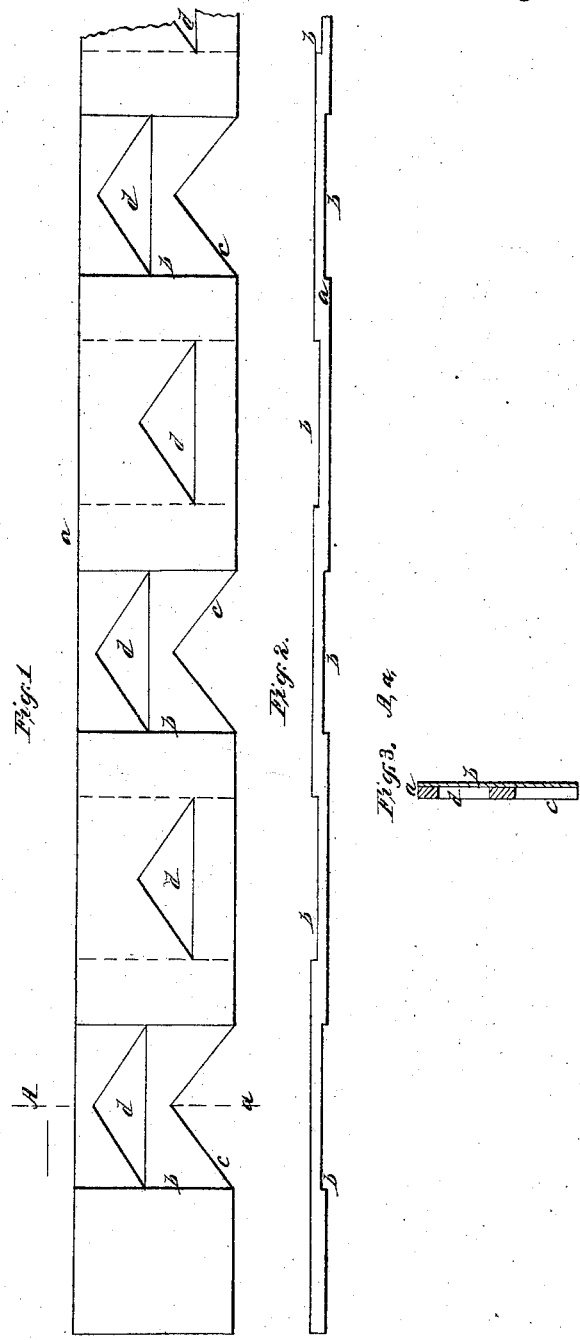

UNITED STATES PATENT OFFICE.

WILLIAM WATSON, OF NEW YORK, N. Y.

STONE AND MARBLE SAW.

Specification of Letters Patent No. 11,432, dated August 1, 1854.

*To all whom it may concern:*

Be it known that I, WILLIAM WATSON, late of Chicago, Illinois, but now of the city, county, and State of New York, have invented certain new and useful Improvements in Saws or Plates for Cutting Marble and other Stone, of which the following is a full, clear, and exact description, reference being had to the accompanying drawings, making part of this specification, in which—

Figure 1, is a side elevation, Fig. 2, an edge view; and Fig. 3, a cross section taken at the line A, a of Fig. 1.

The same letters indicate like parts in all the figures.

In sawing stone, the saw or plate must be lifted up at intervals to permit the sand supplied thereto to get under the edge, which not only occasions a loss of power and time, but as the sand can only get under the edge by passing down the sides between the saw and the stone, the sand thus located cuts away the sides of the saw or plate and the stone also, thereby making the kerf much wider than the thickness of the saw and wasting much of the power employed.

To remedy these defects, the nature of my invention consists in making the saw or plate with channels at the sides extending from the upper to the lower edge for the free passage of the sand to the lower edge, and my invention also consists in making excavations or recesses in the saw plate to receive and hold a supply of sand and permit it readily to find its way under the straight part of the edge of the saw plate.

In the accompanying drawings, $a$ represents a saw plate such as is usually employed for sawing or cutting stone. Vertical channels $b$, $b$, are cut in the two sides of the said plate extending the whole width thereof, and of sufficient depth for the free passage of sand, and at the lower part of those channels the lower edge of the plate is cut out as at $c$, with the two sides inclined in opposite directions, so that the sand which passes down the side channels to those excavations will have an opportunity of getting under the edge and thus effectually break down the texture of the stone. At given intervals I cut triangular holes $d$ through the plate in the channels with one line of the triangle parallel with the edge of the saw, and instead of making each row of holes in the line I prefer to make them at different elevations. The object of these holes is to provide new excavations along the lower edge as the plate wears out with seriously weakening the plate. As the lower part of the shoulders of the channels are beveled, this alone, without the excavations would permit the sand to get under the edge of the saw plate, but not so effectually as with the excavations. Instead of making the excavations on the two sides of the plate, opposite each other, they may be made on one side opposite the spaces between the channels of the other side.

I do not wish to be understood as limiting myself to the form or location of the channels and excavations, as they may be varied without changing the principle or character of my invention.

What I claim as my invention and desire to secure by Letters Patent is—

1. Making saw plates, for cutting stone with channels at the sides, substantially for the supply of sand to the lower edge as set forth.

2. And I also claim the excavations or notches on the lower edge substantially as described, to contain and permit the sand more effectually to get under the edge of the saw plate as set forth.

WILLIAM WATSON.

Witnesses:
GEO. KELLOCK, Jr.,
WILLIAM H. SEELY.